United States Patent [19]

Halpine

[11] 4,168,413
[45] Sep. 18, 1979

[54] PISTON DETECTOR SWITCH

[76] Inventor: Joseph C. Halpine, 1908 W. Latimer Pl., Tulsa, Okla. 74127

[21] Appl. No.: 885,803

[22] Filed: Mar. 13, 1978

[51] Int. Cl.² ............................................. H01H 35/38
[52] U.S. Cl. ........................................ 200/82 E; 73/3; 200/61.41; 200/81.9 M
[58] Field of Search ......................... 340/606, 611, 626; 73/3, 745; 200/61.41, 61.42, 81.9 M, 83 Q, 82 E

[56] References Cited

U.S. PATENT DOCUMENTS

| | | | |
|---|---|---|---|
| 3,274,351 | 9/1966 | Halpine | 200/61.41 |
| 3,421,124 | 1/1969 | Kidd | 200/61.41 |
| 3,478,717 | 11/1969 | Kidd | 200/61.41 |
| 4,079,619 | 3/1978 | Dobesh | 73/3 |

Primary Examiner—Gerald P. Tolin
Attorney, Agent, or Firm—Head, Johnson & Chafin

[57] ABSTRACT

A piston detector switch adapted to be positioned on a pipe having an orifice in the wall thereof which may be briefly described as comprising a plate securable to the pipe having a bore extending therethrough in open communication with the pipe orifice, a valve seat positioned in the bore adjacent the pipe surface, a ball loosely positioned in the bore, having a diameter such that a portion of the ball normally protrudes within the pipe interior when seated, a housing sealably secured to the plate having a duct extending therethrough in open communication with the bore, and magnetically responsive switch means disposed in said duct for signalling movement of the ball from the seated position and for preventing fluid leakage from said duct.

5 Claims, 3 Drawing Figures

PISTON DETECTOR SWITCH

BACKGROUND OF THE INVENTION

The flow measuring devices normally utilized in the pipeline and process industries, such as venturi meters, pitot tubes, and orifice meters, must be calibrated to insure accuracy, as the performance of each varies with the individual fluid properties. Current meter calibration techniques often rely upon positive displacement methods to assure precision. One of said techniques includes the use of a length of pipe having a piston or ball positioned therein with an external diameter substantially equal to the inner pipe diameter. The movement of the piston or ball by the fluid flow through the pipe provides a convenient and accurate check of the volume flow rate. When a metallic piston is used, detection of the position of the piston as it moves along the length of the pipe may be made by electrical or electronic means. When a flexible ball of material, such as rubber, is utilized as a piston, the detection must be by some physical means since the rubber ball would not ordinarily be useful in activating any type of electronic or magnetic detector. This invention provides a means of physically detecting the passage of a piston, such as a rubber ball, in a pipe.

It is therefore an object of this invention to provide a piston detector switch adaptable for use in conjunction with a pipe, to detect the passage of a piston through said pipe.

Another object of this invention is to provide a detector switch which is readily adaptable for field mounting on a pipe with a minimum amount of work and which does not require precise pipe orifices.

Another object of this invention is to provide a detector switch which may be made of readily available and inexpensive components and which may, therefore, be economically constructed.

Another object of this invention is to provide a piston detector switch having improved means of adjusting a switch relative to the actuating mechanism whereby the switch may be accurately calibrated to indicate the passage of a piston thereby.

SUMMARY OF THE INVENTION

This invention may be described as a piston detector switch. More particularly, but not by way of limitation, the invention may be described as a piston detector switch adapted to be positioned in a fluid tight manner over an opening in the side wall of a pipe. Said detector switch comprises a plate sealably mountable on the pipe having a bore extending therethrough in open communication with the pipe opening, a valve seat provided by the plate in the bore adjacent said pipe, a ball loosely positioned in the bore so that a portion of said ball, when seated, protrudes into the pipe interior, a housing sealably secured to the plate having a duct therethrough in open communication with said bore, a ball follower extending from the duct for engaging the ball and carrying a magnet assembly, a plug member having a hollow finger, extending into the interior of the duct, and a switch responsive to the movement of the magnet assembly positioned in the hollow finger.

DETAILED DESCRIPTION OF PREFERRED EMBODIMENTS

Figure 1:
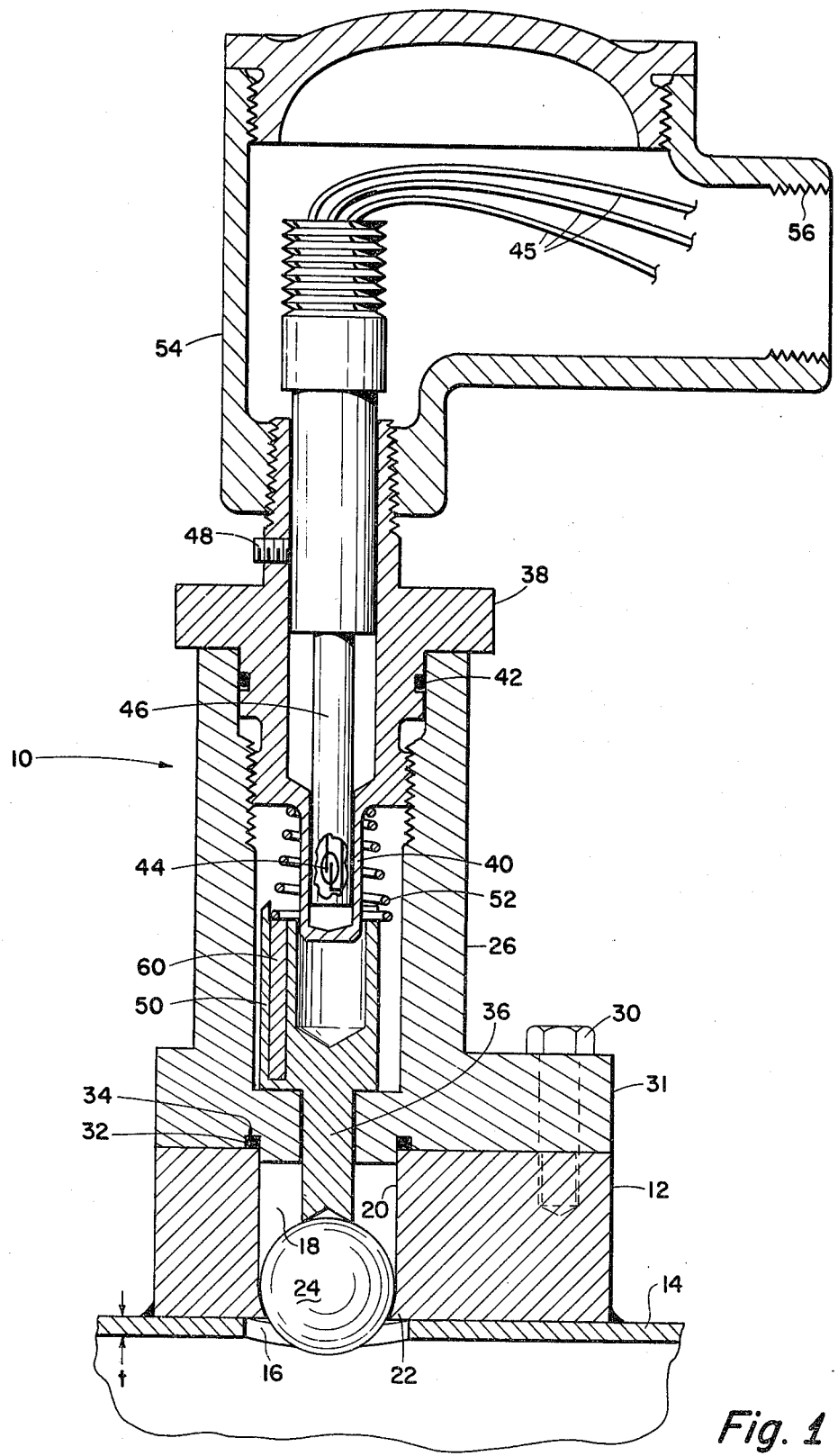
FIG. 1 is an elevational view, partly in section, of a piston detector switch positioned on a pipe for detecting the passage of a piston therethrough.

Referring to the drawings, and in particular to FIG. 1, reference character 10 generally indicates a pipe mounted detector switch for use in detecting passage of a piston through the pipe. A detector plate 12 is suitably secured to a side wall 14 of a pipe having an orifice 16 drilled therein. The pipe orifice diameter need not be precisely drilled; and for use in mounting purposes, it is preferably slightly larger than the diameter of bore 18 extending through plate 12. As shown in FIG. 1, the lower portion of the inner periphery 20 of the plate wall is tapered inwardly to form a valve seat 22. Although tapering of the bore wall is the preferred manner of providing a valve seat, it is apparent that same can be achieved by other suitable and well-known means. The plate 12 is preferably constructed of steel or similar material so that it may be sealably secured to the pipe by welding. A ball 24 having a diameter substantially equal to the diameter of bore 18 is positioned loosely in the bore. The actual bore and ball diameter are selected in view of the pipe side wall thickness, t, so that a portion of the ball protrudes into the pipe interior when the ball is seated in valve seat 22.

Housing 26, having a duct 28 extending therethrough, is mounted to a plate 12 by means of bolt 30 threaded into plate 12 through housing flange 31 so that the duct 28 is in open communication with bore 18. As shown in the figure, sealing between plate 12 and housing 26 is achieved by means of an O ring 32 pressed in groove 34 of the housing between the housing and plate mating surfaces.

Figure 3:
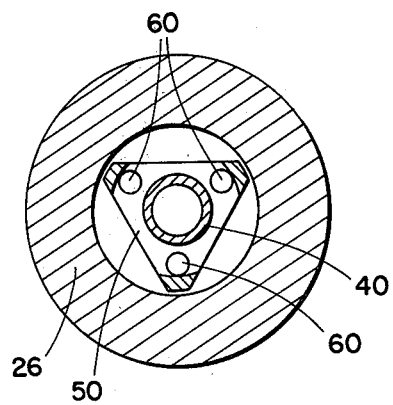
FIG. 3 is a cross-sectional view taken on the line 3—3 of FIG. 2 showing the magnet assembly.

A ball follower 36 extends from the interior of duct 28 for engaging ball 24. Plug 38, preferably constructed of aluminum, is threaded in the top of housing 26 as shown in the figure and has a hollow finger 40 extending into the housing duct interior. Suitable means such as O ring 42 interposed between the plug and housing are provided to prevent fluid leakage from duct 28. A magnetically responsive reed switch 44 held securely by arm 46 is inserted into hollow finger 40 and is electrically connected to leads 45. The position of the reed switch in the hollow finger is adjustable and may be secured in place by means of set screw 48 threaded through plug 38. A magnet assembly 50 is carried by ball follower 36 in duct 28 and preferably comprises a plurality of equilaterally spaced parallel bar magnets as shown more clearly in FIG. 3 for enveloping the hollow finger 40 when elevated. Arm 46 is preferably molded of plastic to minimize interference between the magnetic field of the magnet assembly and the reed switch. A helical compression spring 52 is interposed between plug 38 and magnet assembly 50 for urging the ball 24 to a seated position through ball follower 36. Lower stops 60 are provided by the housing 26 to serve as a ball follower guide and prevent the ball 24 from being dislodged from bore 18 as a result of sudden movement. As shown in FIG. 1, plug 38 is preferably provided with a cover 54 having a conduit receiving coupling 56 for ease in connection with a conductor carrying conduit.

In operation, prior to mounting the detector housing to the plate, the arm 46 carrying the reed switch is lowered inside the hollow finger until the switch is acutated. The arm is then raised slightly and fixed in position by tightening set screw 48. Care should be taken, of course, to assure that the arm is not raised from the point of actuation beyond the magnet assembly travel distance.

Figure 2:
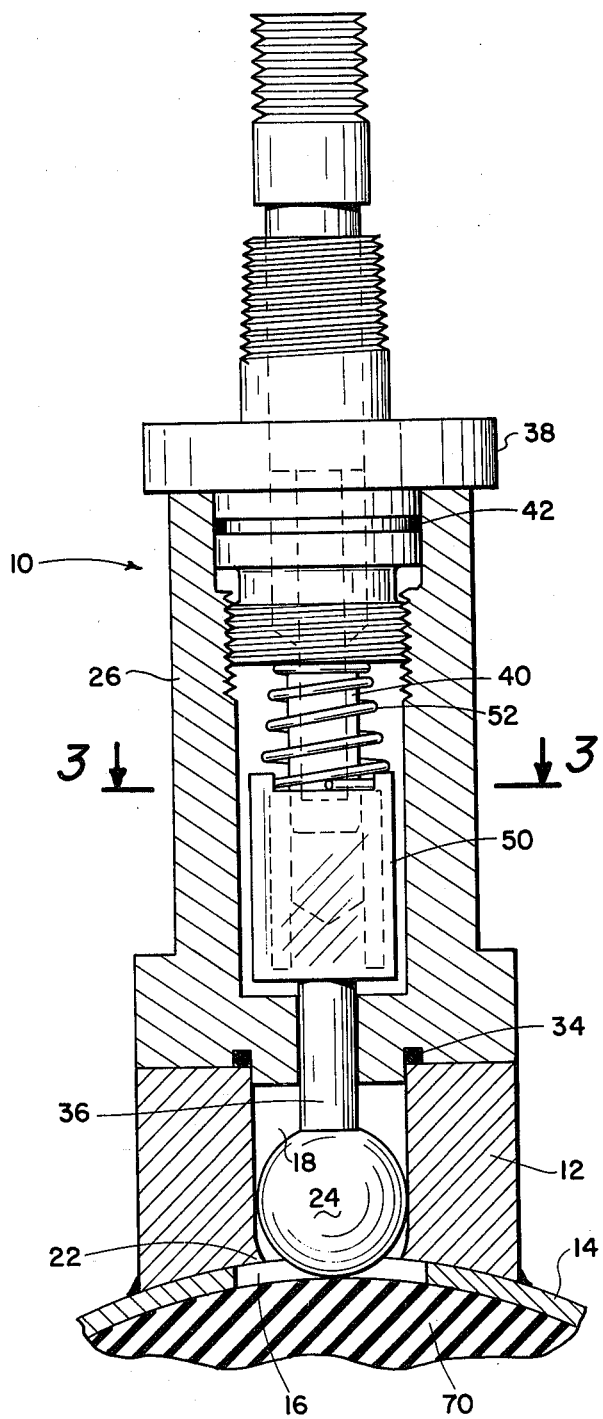
FIG. 2 is an end view of the piston detector switch, partly in cross-section, of the invention in an actuated state.

As shown in FIG. 2, the passage of a piston 70 through the pipe elevates the ball from the seated position, thereby raising the ball follower and magnet assembly 50 in closer proximity to the reed switch, thereby actuating same.

Whereas the present invention has been described in particular relation to the drawings attached hereto, it should be understood that other and further modifications apart from those shown or suggested herein, may be made within the spirit and scope of this invention.

What is claimed is:

1. A detector switch; positioned on a pipe having an orifice in the surface thereof said orifice providing communication with the interior of said pipe; the detector switch comprising:

a plate, sealably mounted on the pipe, the plate having a bore extending therethrough in open communication with said orifice, the inner periphery of the plate at the end of the bore adjacent said pipe being inwardly tapered to form a valve seat;

a ball loosely positioned in the bore, the bore having a diameter such that a portion of said ball, when seated in said valve seat, normally protrudes within the pipe interior;

a housing, sealably secured to the plate, having a duct extending therethrough in open communication with the bore;

a ball follower extending from the interior of the housing duct for engagement with the ball;

a plug member sealably secured to the housing and having a hollow finger extending into the interior of the housing duct;

a magnetically responsive switch adjustably positioned in the hollow finger of the plug member;

a magnet assembly slidably positioned in the housing duct and carried by the ball follower such that upon movement of the ball from the seated position and the corollary movement of the ball follower and magnet assembly, said magnetically responsive switch is actuated; and means for biasing said ball follower to urge the ball to a seated position.

2. A detector switch, as recited in claim 1, wherein said means for biasing the ball follower comprises a helical compression spring interposed between the plug member and the magnet assembly.

3. A detector switch, as recited in claim 2, wherein the plate bore diameter is substantially equal to the ball diameter.

4. A detector switch as recited in claim 3, wherein the magnetically responsive switch is a reed switch.

5. A detector switch as recited in claim 4, wherein said magnet assembly includes a plurality of substantially equilaterally spaced parallel bar magnets which encircle the plug finger upon unseating the ball.

* * * * *